C. CHRISTIANSEN.
RADIUS ROD BRACE AND SELF STEERING DEVICE.
APPLICATION FILED JULY 27, 1916.
1,272,217.
Patented July 9, 1918.
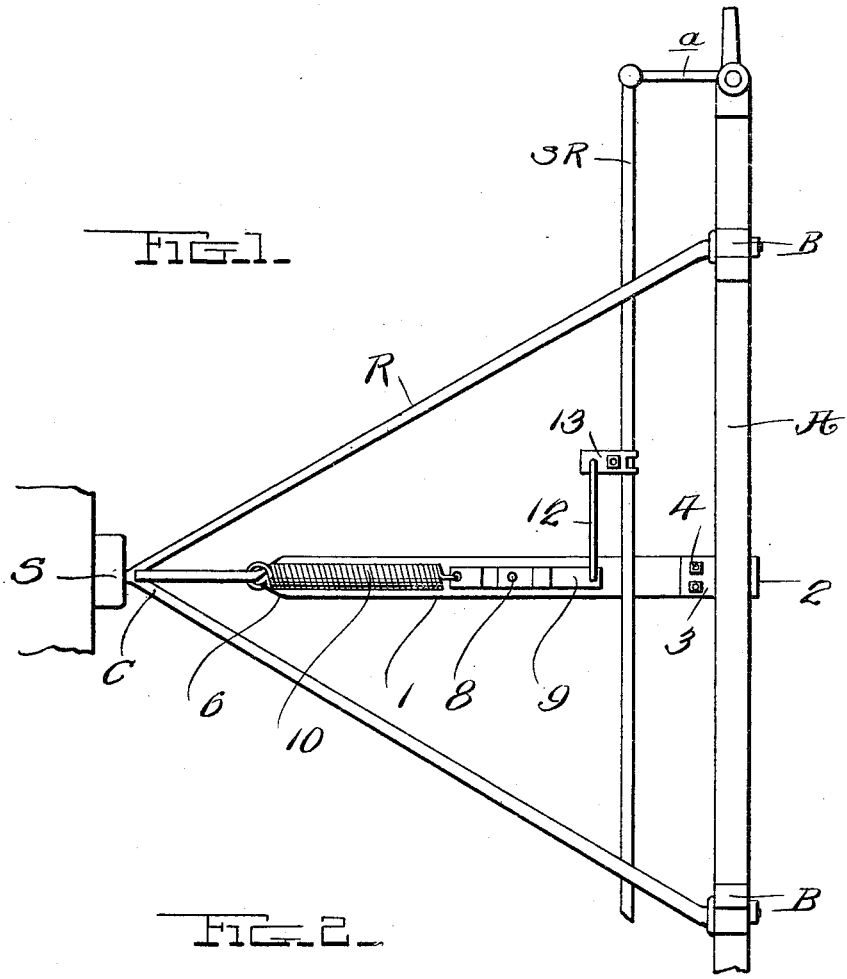
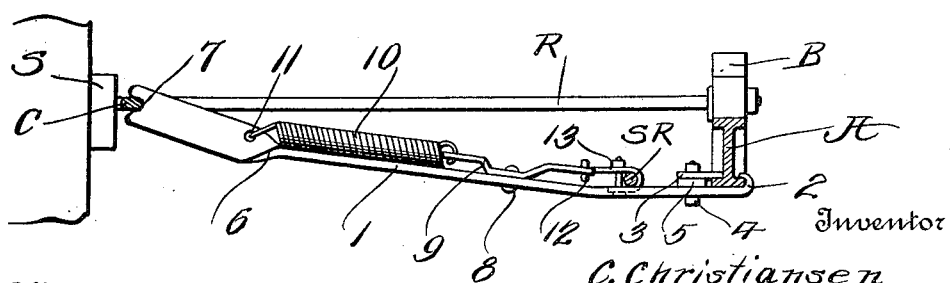
Witness
J. R. Pierce
Inventor
C. Christiansen
By H. B. Wilson & Co.
Attorneys

UNITED STATES PATENT OFFICE.

CHRISTIAN CHRISTIANSEN, OF SIOUX FALLS, SOUTH DAKOTA.

RADIUS-ROD BRACE AND SELF-STEERING DEVICE.

1,272,217.                     Specification of Letters Patent.        Patented July 9, 1918.

Application filed July 27, 1916.   Serial No. 111,742.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Radius-Rod Braces and Self-Steering Devices; and I do declare the following to be a full, clear, and exact description of the invention, such as will enable others skilled in the art to which it appertains to make and use the same.

My invention relates to improvements in automobile accessories and more particularly to those adapted for use in connection with machines of the type employing a V-shaped radius rod anchored at its crotch in a ball socket and secured at its front ends to the front axle. Heretofore, numerous devices have been provided for bracing this rod to prevent the same from bending under excessive strain, most of these devices extending beneath the radius rod from the lower edge of the front axle to the crotch of said rod. Other contrivances have been devised for yieldably holding the steering rod in a neutral position and for returning said rod to this position when the steering wheel is released. Devices for both purposes have proven effective but the application of both to a car renders the same unnecessarily cumbersome and in many cases unsightly. It is therefore the object of the present invention to provide in a single device both self steering means and bracing means for the radius rod.

In carrying out the above named object, I make use of certain novel features of construction and unique combinations of parts to be hereinafter fully described and claimed, the descriptive matter being supplemented by the accompanying drawings which constitute a part of this application and in which:

Figure 1 is a top plan view of a portion of an automobile running gear showing the invention applied;

Fig. 2 is a longitudinal section taken on the plane of the line 2—2 of Fig. 1, the improved device being shown in elevation.

In specifically describing the structure shown in the drawings above briefly described, similar characters will be employed to designate corresponding parts throughout the several views and reference will be herein made to the numerous elements by their respective indices. To this end, A designates the front axle of a well known type of automobile, R refers to the radius rod, and S to the socket in which the usual ball at the crotch of the rod R is universally mounted, the front ends of said rod being secured to the axle A through the instrumentally of the usual brackets B to which the front spring of the vehicle is attached. SR designates a transverse steering rod which is pivoted at its ends to the steering arms *a*, it being to return this rod to a neutral position as well as to brace the radius rod R that the present invention is devised.

A rigid one-piece bar 1 extends between the lower edge of the axle A and the crotch C of the rod R and thus serves to effectively prevent rearward tilting of said axle and therefore to brace the rod R against upward bending caused by such tilting. Furthermore, the rod 1 receives a great amount of rearward thrust commonly exerted on the rod R and thus further relieves the latter of a great deal of strain.

The bar 1 is preferably about an inch and one-half or an inch and three-quarters wide and approximately a half inch thick in order that it may effectively resist the strain placed thereon, the ends of said bar being preferably directed upwardly on a slight incline to depress the intermediate portion of said bar sufficiently to clear the steering rod SR. The extreme front end of bar 1 is decreased in thickness and bent upwardly and rearwardly to provide a hook 2 receiving the usual rib along the front of the axle A at the lower edge thereof. Coöperating with hook 2 is a clamping plate 3 which overlies the lower bead on the rear side of the axle A, bolts 4 being provided for drawing said plate into operative position. Preferably a washer plate 5 is interposed between plate 3 and bar 1. Near its rear end bar 1 is given a quarter twist as indicated at 6 while said rear end is provided in its extremity with a notch 7 which forms a seat receiving therein the crotch C.

By constructing bar 1 in the precise manner shown and described, it may be easily and inexpensively manufactured yet when applied to use will be highly efficient.

Fulcrumed between its ends at 8 to the bar 1 adjacent the upper side of the latter, is a horizontally swinging lever 9 with vertically offset ends. A coil spring 10 is connected at its front end with the rear end of the lever 9 and the rear end of said spring is anchored by passing it through an opening 11 in the vertically extending rear end of bar 1. The front end of lever 9 is connected by means of a suitable link 12 to a clamp 13, the latter being secured to the steering rod SR. It will thus be evident that the spring 10 will normally exert its tension to retain said steering rod in its neutral position and will also return said rod to this position when the operator permits by sufficiently releasing the steering wheel or by turning the latter toward its normal position.

From the foregoing taken in connection with the accompanying drawings, it will be observed that although the invention is extremely simple and inexpensive, it will be highly efficient and durable and will perform two functions for which two independent devices have heretofore been necessary. The preferred form of the device is illustrated but it is to be understood that within the scope of the invention as claimed, numerous changes may be made without sacrificing the main advantages thereof.

I claim:

A combined radius rod brace and self steering device for automobiles comprising a substantially straight approximately horizontal bar having near one end a quarter twist and inclining upwardly to a slight extent from this twist to said end, said inclined portion having its sides disposed vertically and said end having a notch to receive the crotch of the radius rod, the remainder of the length of said bar having its sides disposed in substantially horizontal planes and the end of the bar opposite said notch being bent upwardly and inwardly to form a hook to receive the lower bead at the front side of the automobile axle, a clamping plate at the upper side of said bar for passage over the lower bead at the rear side of the axle, a bolt for drawing said plate toward said bar, a lever positioned longitudinally on the front portion of said bar and fulcrumed between its ends thereto, the front and rear ends of said lever being offset upwardly, a coiled spring connected to the rear end of said lever at its front end and hooked at its rear end into an opening in said inclined portion of said bar, a rod extending laterally from and pivoted to the front end of said lever, and a clamp for connecting said rod pivotally to the transverse steering rod of the machine.

In testimony whereof I have hereunto set my hand in the presence of two subscribing witnesses.

CHRISTIAN CHRISTIANSEN.

Witnesses:
HAROLD G. LEDYARD,
SWING K. GRIGSBY.